UNITED STATES PATENT OFFICE.

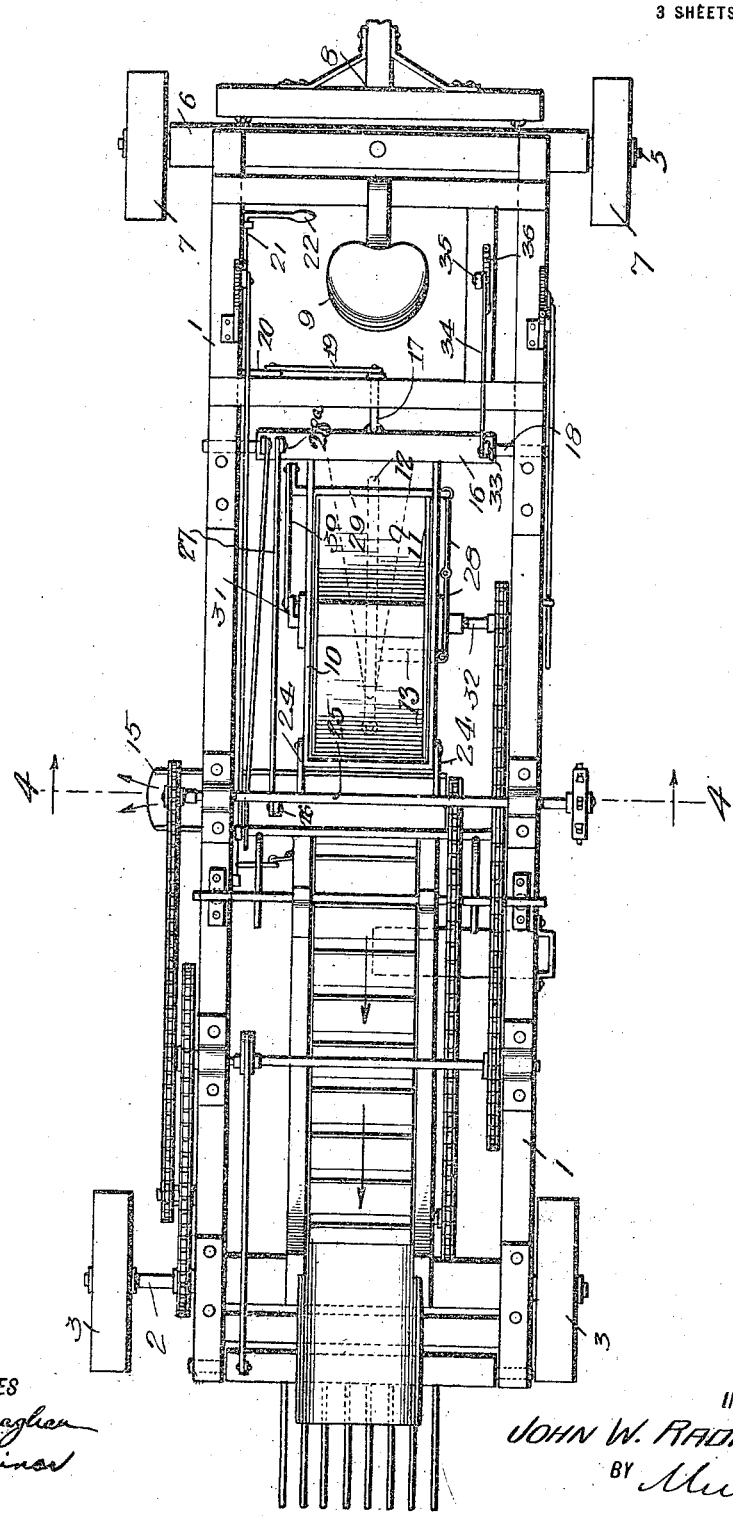

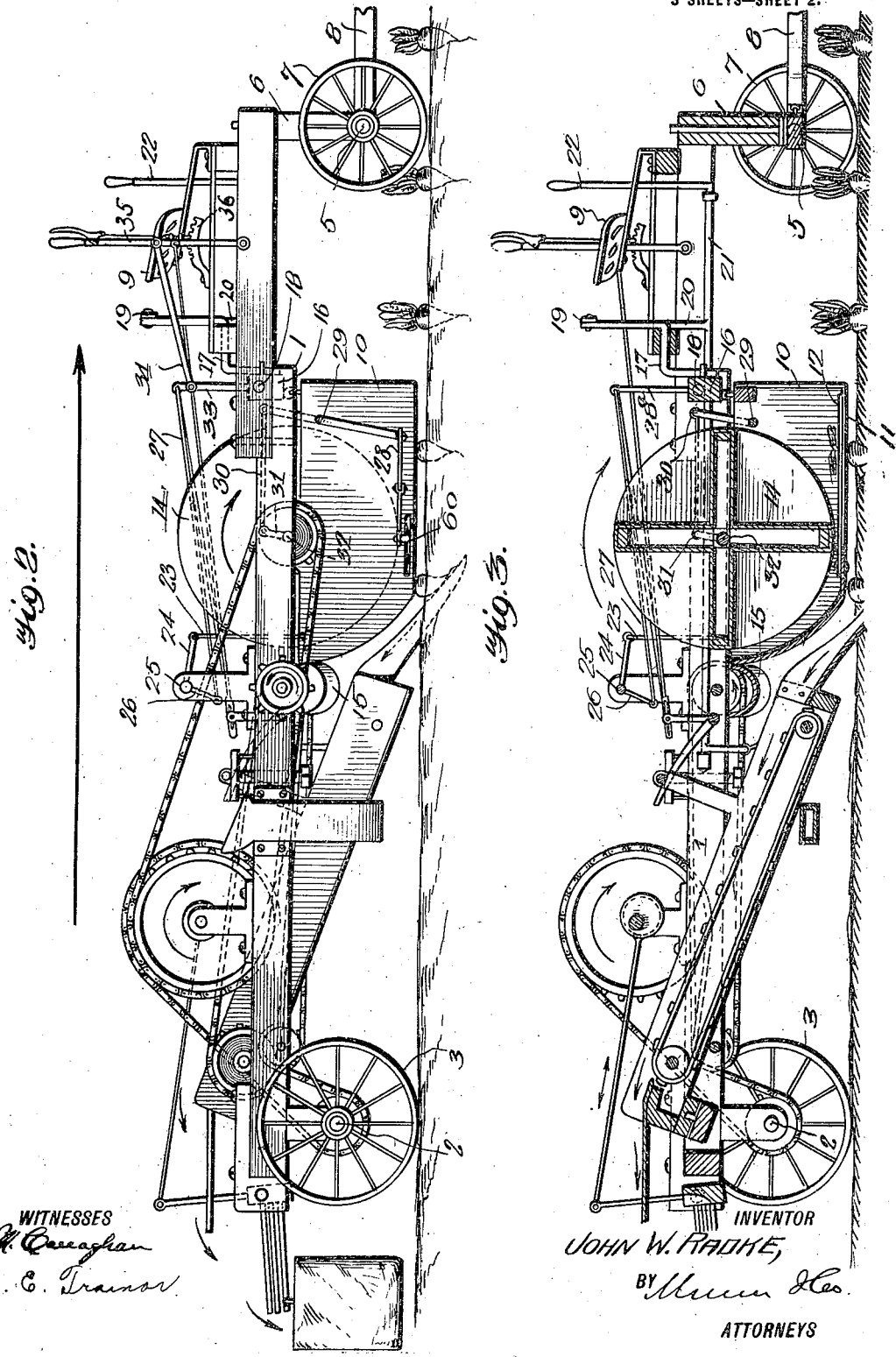

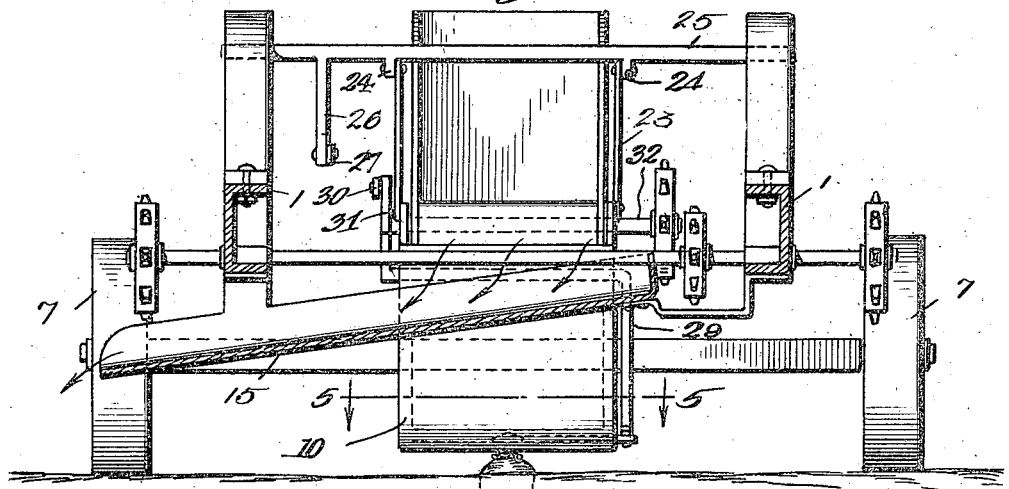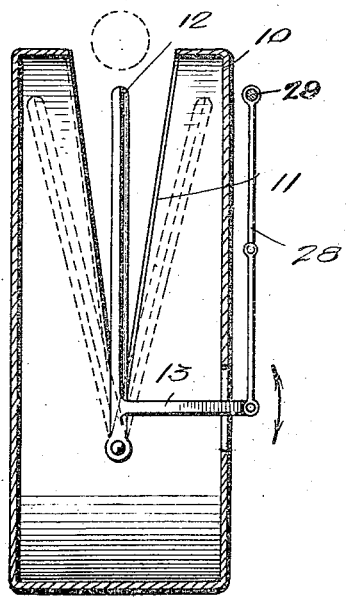

JOHN WILL RADKE, OF DOLLAR BAY, MICHIGAN.

VEGETABLE-HARVESTER.

1,255,051.      Specification of Letters Patent.      Patented Jan. 29, 1918.

Application filed September 8, 1916. Serial No. 118,994.

*To all whom it may concern:*

Be it known that I, JOHN W. RADKE, a citizen of the United States, and a resident of Dollar Bay, in the county of Houghton and State of Michigan, have invented a certain new and useful Improvement in Vegetable-Harvesters, of which the following is a specification.

My invention is an improvement in vegetable harvesters, and has for its object to provide a mechanism of the character specified for topping the vegetables while they are in the ground and for removing the tops from the machine and from the rows.

In the drawings:

Figure 1 is a top plan view of the improved topper;

Fig. 2 is a side view;

Fig. 3 is a longitudinal vertical section;

Fig. 4 is a section on the line 4—4 of Fig. 1;

Fig. 5 is a section on the line 5—5 of Fig. 4, both views looking in the direction of the arrows adjacent to the line.

In the present embodiment of the invention, a supporting frame 1 is provided, the said frame having at its rear end an axle 2 provided with wheels 3 and having at its front end an axle 5 which is pivotally connected to a bolster 6 on the frame, and wheels 7 are journaled on the axle. Draft apparatus indicated at 8 is provided in connection with the front axle and behind the axle is arranged a seat 9. In rear of the seat is arranged a species of casing 10, open at its top and supported from the frame in a manner to be presently described, and this casing is provided at its front end with an opening and in its bottom with a V-shaped slot 11, extending from the opening to near the rear end of the casing, the edges of the slot being beveled as shown.

A blade 12 is pivoted at the apex of the slot to swing across the slot as indicated in dotted lines in Fig. 5, and this blade has a lateral arm 13 which extends through a slot in the side wall of the casing and is connected to mechanism for swinging the blade. The blade and the slot constitute a topping mechanism for cutting the tops from potatoes, beets, or the like. As the machine moves forward along the row, the tops, as indicated in Figs. 2 and 3, will enter the V-shaped slot and as the blade swings in either direction, the tops will be cut and will fall into the casing on either side of the slot.

Means are also provided for moving the tops out of the casing, the said means comprising a reel 14 which is journaled transversely of the casing, and it will be noticed that the rear wall of the casing is curved to correspond roughly with the periphery of the reel. This reel consists of spaced disks connected by hollow radial arms, as shown, and the reel moves in a direction to move the tops upwardly along the curved rear wall of the casing where they are delivered into a laterally extending trough 15 which delivers them at one side of the machine.

The casing 10 is supported by links from a supporting bar 16, the said bar having at its ends journal pins 18 which move in openings in the frame, and the journal pins, it will be noticed, are arranged nearer the top than the bottom of the bar. A crank shaft arm 17, consisting of two portions offset laterally with respect to each other, is connected with the front of the bar at the center thereof, and the said arm is journaled in a cross bar on the frame 1. A link 19 connects the upper end of the shaft with a radial arm 20 on the shaft 21, journaled on the frame at one side thereof, and having an angular portion 22 for convenience in oscillating the shaft. It will be evident that when the shaft is oscillated the casing will be moved laterally with respect to the frame. The rear end of the casing is supported by swinging links 23 which connect the opposite sides thereof with radial arms 24 on the shaft 25 journaled above the frame in bearing brackets as shown. The shaft 25 is provided with another radial arm 26 and a link 27 connects this arm 26 with an upstanding arm 28ª on the bar 16. The bar 16 has an upstanding arm 33 which is connected by a link 34 with a lever 35 pivoted to the frame and having latch mechanism coöperating with the toothed segment 36. By means of this lever the casing 10 may be adjusted vertically. It will be evident from the description that when the said arm has swung forwardly at its upper end, the casing will be raised at both ends, the bar 16 causing it to swing up at its front end while the shaft 25 causes the rear end to swing upwardly.

The cutting blade 12 is operated through a connection indicated at 28. One of the arms of the crank shaft 29 is journaled transversely of the casing in front of the reel, and the other arm of the crank shaft is connected by a link 30 with a crank 31 on the shaft 32 of the reel. It will be evident that when the reel rotates the crank shaft will be rotated to swing the blade back and forth across the opening or slot.

In the operation of the above described mechanism, the machine is drawn through the field along the row with the plants passing in at the slot 11. The blade 12 will cut off the tops which the reel 14 will deliver from the machine through the trough 15.

I claim:—

1. In a vegetable harvester, a wheel supported frame, a casing supported at the front of the frame and having a slotted passage in its bottom, said passage having its side walls converging toward the rear of the casing for receiving the tops of the vegetables, a blade pivoted on the bottom of the casing and mounted to move across the opening for cutting the tops, means for swinging the blade, a reel within the casing for receiving the tops from the casing, and a discharge chute to which the reel delivers.

2. In a vegetable harvester, a wheel supported frame, a casing supported at the front of the frame and having a slotted passage in its bottom, said passage having its side walls converging toward the rear of the casing for receiving the tops of the vegetables, a blade pivoted on the bottom of the casing and mounted to move across the opening for cutting the tops, and means for swinging the blade.

3. In a vegetable harvester, a wheel supported frame, a casing supported at the front of the frame and having a slotted passage in its bottom, said passage having its side walls converging toward the rear of the casing for receiving the tops of the vegetables, a blade pivoted on the bottom of the casing and mounted to move across the opening for cutting the tops, a reel within the casing for lifting the tops therefrom, and a connection between the reel and the blade for swinging the same.

4. In a vegetable harvester, a wheel supported frame, a casing supported at the front of the frame and having a slotted passage in its bottom, said passage having its side walls converging toward the rear of the casing for receiving the tops of the vegetables, and a blade pivoted on the bottom of the casing and mounted to move across the opening for cutting the tops.

JOHN WILL RADKE.

Witnesses:
 MICHAEL KELLY,
 JAMES W. DUNSTON.

Copies of this patent may be obtained for five cents each, by addressing the "Commissioner of Patents, Washington, D. C."